Feb. 8, 1944.                K. L. HANSEN                2,341,095
                           COMMUTATION MEANS
                       Original Filed Dec. 24, 1941
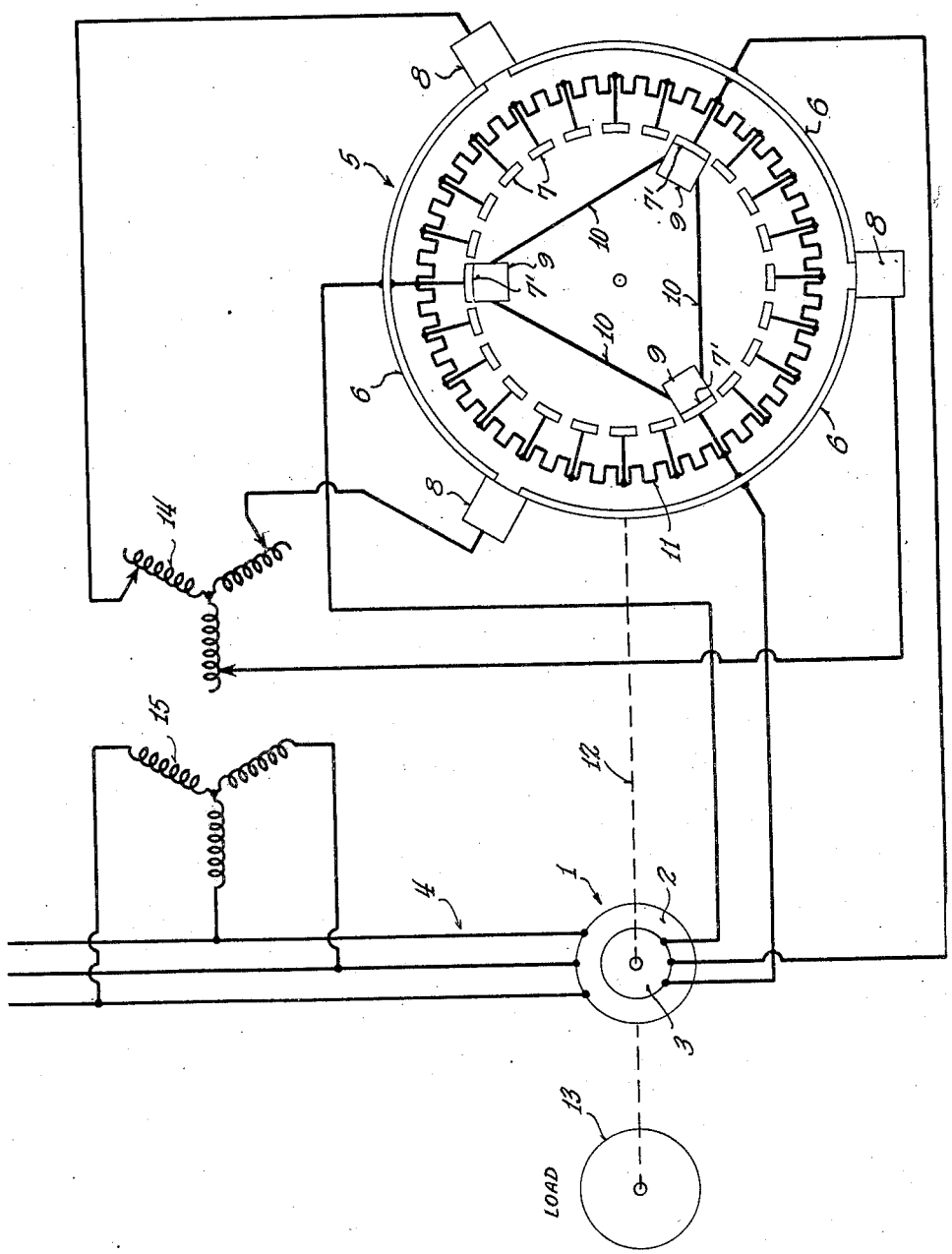
                                                    INVENTOR.
                                                 KLAUS L. HANSEN
                                             BY
                                                    ATTORNEY.

Patented Feb. 8, 1944

2,341,095

UNITED STATES PATENT OFFICE 2,341,095

COMMUTATION MEANS

Klaus L. Hansen, Milwaukee, Wis.

Original application December 24, 1941, Serial No. 424,272. Divided and this application May 4, 1942, Serial No. 441,597

6 Claims. (Cl. 172—280)

This invention relates to commutation means.

This application is a division of my copending application for Commutation means and method of commutation, Serial No. 424,272, filed December 24, 1941.

Objects of this invention are to provide commutation means in which a plurality of main segments are provided which have interposed therebetween variable resistances that periodically and automatically fluctuate between maximum and minimum having minimum value at the instant of commutation and having maximum value between the periods of commutation, thereby securing good commutation and a high efficiency.

Further objects are to provide a device in which the novel form of commutation means is so associated with other portions of the device that power factor correction, speed control and frequency conversion may be secured as desired.

In greater detail, objects of this invention are to provide a device which has the novel commutation means associated with a polyphase motor which drives a load, the arrangement being such that main and auxiliary commutator means are employed which are associated with a resistor and with main and auxiliary brushes and bridging circuits between the auxiliary brushes, the arrangement being such that the commutation means connects the variable voltage secondaries of a polyphase transformer with the wound rotor of the polyphase motor whose stator windings are supplied from the same source of polyphase current that supplies the transformer, all brushes being shiftable as a unit to the desired position depending on whether power factor correction or speed variation is required, and the voltage impressed on the rotor of the polyphase motor being controlled by the voltage of the variable voltage transformer so that the voltage may be adjusted together with the position occupied by the brushes to give the desired amount of correction for power factor or the desired amount of speed variation or both.

Before discussing the illustrated embodiment of this invention, a brief outline is given of the theories involved.

Assume, in an induction motor, that the rotor winding and leads are symmetrical with reference to the primary, and that the ratio of transformation is 1 to 1. At standstill, with the secondary open-circuited, the induced voltage is approximately equal and opposite to the impressed voltage. If, then, the secondary leads are connected to the line terminals so as to impress on the secondary voltage equal and bucking the induced voltage, the only current that would flow in the secondary is a part of the primary exciting current and no torque would be developed. The free running speed of the motor has therefore in that case been reduced to zero. On the other hand, assume that an impressed voltage boosting the secondary induced voltage is impressed on the rotor circuits. There is then obviously no tendency to reduce the torque to zero at any speed below synchronism. Although the induced voltage is zero at synchronism, there is a torque because the inserted voltage maintains a torque-producing current and the rotor continues to accelerate. As the rotor speeds up above synchronism, the secondary induced voltage increases in magnitude and has changed sign, and is therefore in opposition to the impressed voltage. Manifestly, the motor will speed up until the induced and inserted voltages are of approximate equality and the secondary current and torque reduced to zero. Because of the fact that the secondary induced E. M. F. changes its phase angle through 180° above synchronism, it must be understood that when speaking of the inserted E. M. F. as boosting or bucking the induced E. M. F., it is the phase relations below synchronism that are referred to.

It is obvious also that if the impressed voltage is bucking the induced voltage, that the effective voltage inducing torque-producing current is reduced and consequently the speed of the motor is reduced.

A full discussion of these theories is given in a paper by the inventor herein named published in the Journal of the American Institute of Electrical Engineers of December, 1923, page 1321, entitled "Modification of polyphase induction motor performance by introduction of E. M. F. in secondary."

An embodiment of the invention is shown in the accompanying drawing, in which:

The figure is a view of a device for producing frequency conversion, power factor correction and speed control.

Referring to the drawing, it will be seen that a three-phase motor is indicated generally by the reference character 1. It has a wound stator 2 and a wound rotor 3, the stator winding being connected to the three-phase mains 4. A commutating device indicated generally at 5 is provided and has a main commutator and an auxiliary commutator. The main commutator is composed of the three main sections 6 and the auxiliary commutator is composed of a plurality of relatively small segments 7, three of which at regularly spaced intervals may be enlarged as indicated at 7'. Main brushes 8 are provided which bear on the main commutator and auxiliary brushes 9 bear on the auxiliary commutator. The auxiliary brushes are short-circuited by bridging circuits 10. The commutator means 5 is provided with a continuous resistor 11 which is connected at regularly spaced intervals to the auxiliary segments 7 and 7'. The auxiliary segments 7' are directly connected also to the main commutator segments 6. The main commutator segments 6 are permanently connected to the windings of the wound rotor 3 of the polyphase alternating current motor, it being noted that the commutator means is mounted directly on the shaft 12 of the motor. The motor is connected to a load as indicated at 13 in any suitable manner.

The main brushes 8 are connected to the tapped secondaries 14 of a three-phase transformer whose primaries 15 are connected to the mains 4. It is to be noted that the voltage supplied by the secondaries may be varied by connecting to any suitable tap on the secondaries.

It is to be noted that the segments 7' of the auxiliary commutator and the auxiliary brushes 9 are of such proportions that before a main brush engages an approaching segment of the main commutator or leaves a receding segment of the main commutator, such segments of the main commutator are short-circuited by the auxiliary brushes and the bridging circuits.

The arrangement of the commutator means is such, as has been described hereinabove and shown, that the continuous resistor 11 is connected at three equally spaced points to the segments 6 of the main commutator and is connected at regular points to the successive segments of the auxiliary commutator. Although the three-phase motor 1 has been shown as positively connected by means of the shaft 12 with the main and auxiliary commutators and with a load 13, it is to be understood that it may be connected in any suitable manner.

It is to be understood that the auxiliary and main brushes are all shifted as a unitary structure to any desired position.

The arrangement shown provides both power factor correction and speed variation depending on the brush position and the voltage impressed on the wound secondary or rotor 3 of the motor from the secondaries 14 of the transformer.

For power factor correction the brushes would be set electrically at right angles from their neutral position to produce a magnetizing component and the amount of voltage supplied would determine the amount of power factor correction. The amount of voltage supplied would be obtained by adjusting the taps on the secondaries 14 of the transformer.

For speed variation the brushes would be set to produce an energy component in phase with the induced voltage, either assisting or opposing depending on whether speed increase or decrease for the rotor of the variable speed three-phase motor is desired. Thereafter by varying the voltage of the secondaries of the three-phase transformer, variation in the speed of rotation to the desired point could be obtained.

In intermediate positions of the brushes it is possible to produce both a variation in power factor and in speed.

It will be seen that substantially sparkless commutation results as the segments of the main commutator are connected by a bridging path at the time of commutation. The main segments are also connected through the auxiliary brushes and their bridging circuits and through portions of the resistor 11. It is apparent from an examination of the drawing that the resistance is gradually increased as the commutator rotates so that when the main brushes are midway between their points of commutation, the resistance between the main segments is a maximum. This variation in resistance of the path between the segments of the main commutator, therefore, periodically and automatically varies between maximum and minimum to avoid needless losses while securing substantially sparkless commutation.

Wherever auxiliary commutator is referred to, it is intended to cover a construction whether the auxiliary commutator is wholly distinct and separate from the main commutator or whether it is made as a part of the main commutator.

Although this invention has been described in considerable detail, it is to be understood that such description is intended as illustrative rather than limiting, as the invention may be variously embodied and is to be interpreted as claimed.

I claim:

1. In a power factor and speed control device of the class described, the combination of a source of polyphase alternating current, a polyphase motor having two units consisting of a wound stator and a wound rotor, a main commutator and an auxiliary commutator driven from said polyphase motor, said main commutator having a plurality of segments electrically connected to the windings of one of the units of said polyphase motor, the other unit of said polyphase motor being connected to the source of polyphase alternating current, said auxiliary commutator having a plurality of segments, regularly spaced segments of said auxiliary commutator being connected to the segments of said main commutator, a resistor having spaced points connected to the segments of said auxiliary commutator, a plurality of auxiliary brushes bearing upon said auxiliary commutator and joined by bridging means, and a plurality of main brushes bearing on said main commutator and supplied with alternating current from said source of polyphase alternating current.

2. In a power factor and speed control device of the class described, the combination of a source of polyphase alternating current, a polyphase motor having two units consisting of a wound stator and a wound rotor, a main commutator and an auxiliary commutator driven from said polyphase motor, said main commutator having a plurality of segments electrically connected to the windings of one of the units of said polyphase motor, the other unit of said polyphase motor being connected to the source of polyphase alternating current, said auxiliary commutator having a plurality of segments, regularly spaced segments of said auxiliary commutator being connected to the segments of said main commutator, a resistor having spaced points connected to the segments of said auxiliary commutator, a plurality of auxiliary brushes bearing upon said auxiliary commutator and joined by bridging means, and a plurality of main brushes bearing on said main commutator and supplied with alternating current from said source of polyphase alternating current, said main and auxiliary brushes being shiftable.

3. In a power factor and speed control device of the class described, the combination of a source of polyphase alternating current, a polyphase motor having two units consisting of a wound stator and a wound rotor, main commutation means, an auxiliary commutator driven from said polyphase motor, said main commutation means having two units consisting of a plurality of segments and a plurality of brushes bearing on said segments, one unit of said main commutation means being connected to one of the units of said polyphase motor, means for supplying the other unit of said main commutation means with variable voltage polyphase alternating current from said source of polyphase alternating current, one unit of said main commutation means being driven from said polyphase motor, the other unit of said polyphase motor being supplied from said source of polyphase alternating current, said auxiliary commutator having a plurality of segments, regularly spaced segments of said auxiliary commutator being connected to the segments of said main commutation means, a resistor having spaced points connected to the segments of said auxiliary commutator, and a plurality of auxiliary brushes bearing upon the auxiliary commutator and joined by bridging circuits, said main and auxiliary brushes being shiftable.

4. In a frequency conversion device, main commutator means including two sets of elements, one set of elements consisting of brushes and the other set of elements consisting of a plurality of segments, auxiliary commutator means consisting of two sets of elements, one of said sets of elements consisting of a plurality of segments and the other of said sets of elements consisting of a plurality of brushes connected by bridging circuits, a closed resistor having spaced points connected to the segments of said auxiliary commutator means, said resistor being connected at spaced points to said main commutator segments, motor means for driving said main and auxiliary commutator means, said motor means having primary and secondary windings, means for supplying polyphase electric energy to one set of elements of said main commutator means, and means for supplying polyphase energy to the primary of said motor means, the secondary of said motor means receiving energy from the other set of elements of said main commutator means.

5. In a device of the class described, a source of polyphase alternating current, a polyphase transformer having the primaries thereof connected to said source of polyphase current and having tapped secondaries; a polyphase motor having a wound primary supplied from said source of polyphase current and having a wound secondary having the same number of phases as said primary; commutation means including a main commutator having main segments connected to the wound secondary of said polyphase motor and having brushes connected to the tapped secondaries of said polyphase transformer, an auxiliary commutator having a plurality of segments, equally spaced segments of said auxiliary commutator being connected to the segments of said main commutator, auxiliary brushes bearing on said auxiliary commutator, and a closed resistor having successive points connected to the segments of said auxiliary commutator; and bridging circuits connecting the brushes of said auxiliary commutator.

6. In a device of the class described, a source of polyphase alternating current, a polyphase transformer having the primaries thereof connected to said source of polyphase current and having tapped secondaries; a polyphase motor having a wound primary supplied from said source of polyphase current and having a wound secondary having the same number of phases as said primary; commutation means including a main commutator having main segments connected to the wound secondary of said polyphase motor and having brushes connected to the tapped secondaries of said polyphase transformer, an auxiliary commutator having a plurality of segments, equally spaced segments of said auxiliary commutator being connected to the segments of said main commutator, auxiliary brushes bearing on said auxiliary commutator, and a closed resistor having successive points connected to the segments of said auxiliary commutator; and bridging circuits connecting the brushes of said auxiliary commutator, all of said brushes being shiftable as a unit.

KLAUS L. HANSEN.